(No Model.) 7 Sheets—Sheet 1.
B. L. STOWE.
CIRCULAR LOOM, &c.

No. 446,085. Patented Feb. 10, 1891.

Witnesses:
Henry Eibling
Frederick A. Stowe

Inventor
Benjamin L. Stowe (No Model.) 7 Sheets—Sheet 3.

B. L. STOWE.
CIRCULAR LOOM, &c.

No. 446,085. Patented Feb. 10, 1891.

Witnesses:
Henry Eisling
Frederick A. Stowe

Inventor
Benjamin L. Stowe (No Model.) 7 Sheets—Sheet 4.
B. L. STOWE.
CIRCULAR LOOM, &c.

No. 446,085. Patented Feb. 10, 1891.

Witnesses:
Henry Eibling
Frederick A. Stowe

Inventor
Benjamin L. Stowe (No Model.)  7 Sheets—Sheet 6.

B. L. STOWE.
CIRCULAR LOOM, &c.

No. 446,085. Patented Feb. 10, 1891.

Witnesses:
Henry Eichling
Frederick A. Stowe

Inventor
Benjamin L. Stowe (No Model.)　　　　　　　　B. L. STOWE.　　　　7 Sheets—Sheet 7.
CIRCULAR LOOM, &c.

No. 446,085.　　　　　　　　　　Patented Feb. 10, 1891.

Witnesses:　　　　　　　　　　　　　　　Inventor

UNITED STATES PATENT OFFICE.

BENJAMIN L. STOWE, OF BROOKLYN, ASSIGNOR TO J. VAN D. REED, OF NEW YORK, N. Y.

CIRCULAR LOOM, &c.

SPECIFICATION forming part of Letters Patent No. 446,085, dated February 10, 1891.

Application filed November 30, 1887. Renewed June 13, 1890. Serial No. 355,346. (No model.)

*To all whom it may concern:*

Be it known that I, BENJAMIN L. STOWE, of Brooklyn, in the county of Kings and State of New York, have invented certain new and useful Improvements in Circular Looms for Weaving Fire-Hose and other Tubular Fabrics, of which the following is a specification.

My present invention relates to circular looms of the class described in my Letters Patent, No. 194,740, of August 28, 1877; and it comprises improved mechanisms for forming the warp-sheds, for holding the warp-bobbins and conducting the warps therefrom into the sheds, for controlling the tension of the warps and the weft, for taking up the fabric as it is woven, for measuring the same, and for controlling the tension of the rubber tubes when it is desired to weave the fabric around the same.

My improvements can best be explained and understood by reference to the accompanying drawings, in which—

Fig. 4 is a side elevation, Fig. 6 is a developed plan, In Figs. 6 to 9, inclusive, the arrangement of rails and harness-operating rods is that employed when an uneven number of shuttles is used. Fig. 15 is a plan.

The loom in its general organization resembles the loom described in my aforesaid Letters Patent, No. 194,740.

Figure 2:
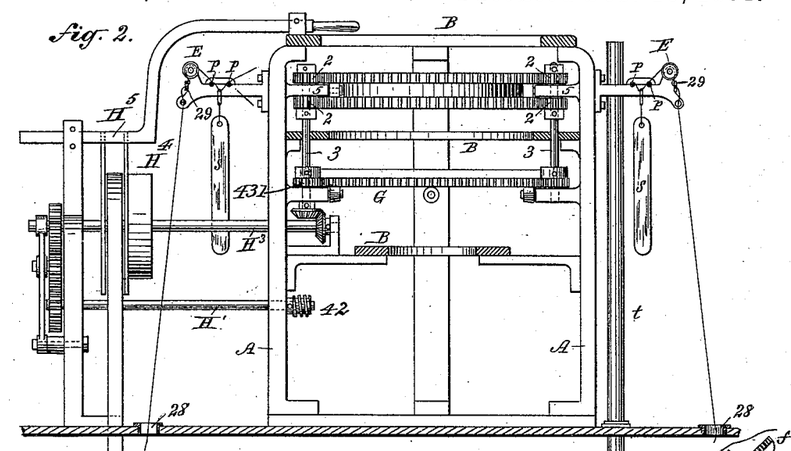
Fig. 2 is a side elevation, partly in section, of the loom, showing also a warp-creel stationed upon a floor beneath the one upon which the loom is placed, and illustrating the manner in which the warps are conducted from the bobbins up to the loom. In this figure I have omitted to show the shed-forming devices and the take-up mechanism.
Figure 3:
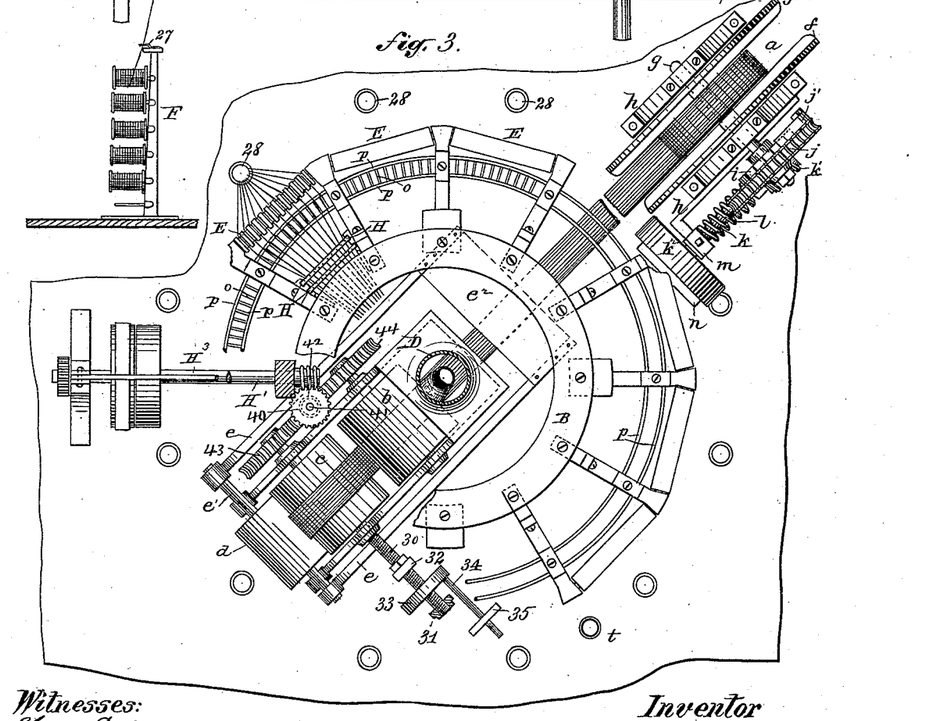
Fig. 3 is a plan of the loom, omitting the segmental shuttle and the shed-forming devices, a portion of the frame and working parts supported thereby being broken away, so as to uncover the take-up mechanism.

The frame-work of the machine is circular, comprising posts A upon ledges projecting inwardly, from which are supported and secured the rings B. In the center of the machine rises the hollow pillar or tube D, terminating some little distance below the middle one of the rings B. Motion is imparted to the shuttle or shuttles and to the guide-rails from the main shaft $H^3$, provided, as usual, with fast and loose pulleys $H^4$ and a belt-shipper $H^5$, as indicated in Fig. 2. Shaft $H^3$ through gearing also drives a supplemental shaft $H'$, having on its inner end a worm which meshes with a worm-gear 40 on a vertical shaft 41, provided also with a worm 42', which engages and drives worm-gears 43 44, fast on the take-up drums *b c*, as described and illustrated in Letters Patent No. 161,272, of March 23, 1875, and as illustrated in Figs. 1 and 3 of the drawings herein.

Figures 1, 20, 21, 22:
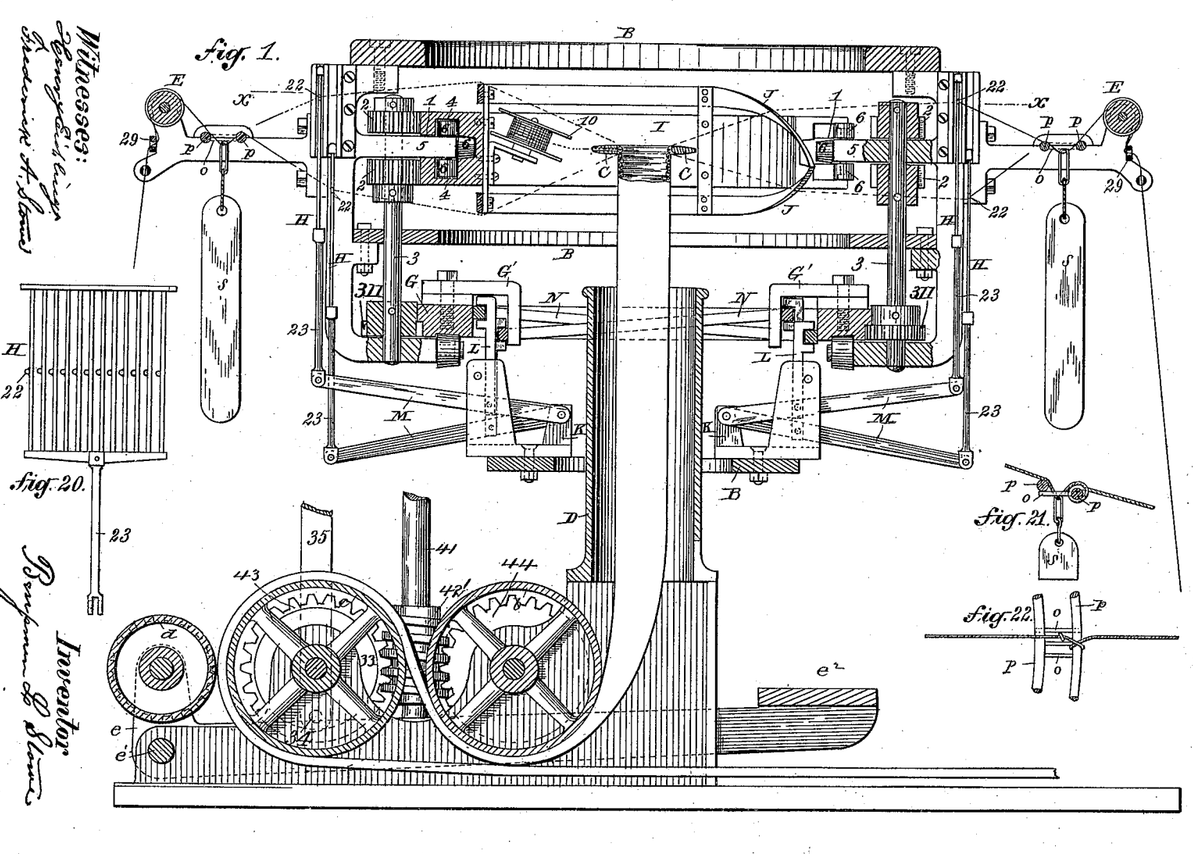
Figure 1 is a vertical central section of my improved loom in the line of the take-up drums. In this figure the supporting-standards forming part of the frame-work of the machine are omitted in order not to obscure the working parts.
Fig. 20 is a face view of one of the warp-harnesses.
Figs. 21 and 22 represent on enlarged scale, in elevation and plan, respectively, the warp-tension which I prefer to employ.
Figures 10, 11, 12, 13:
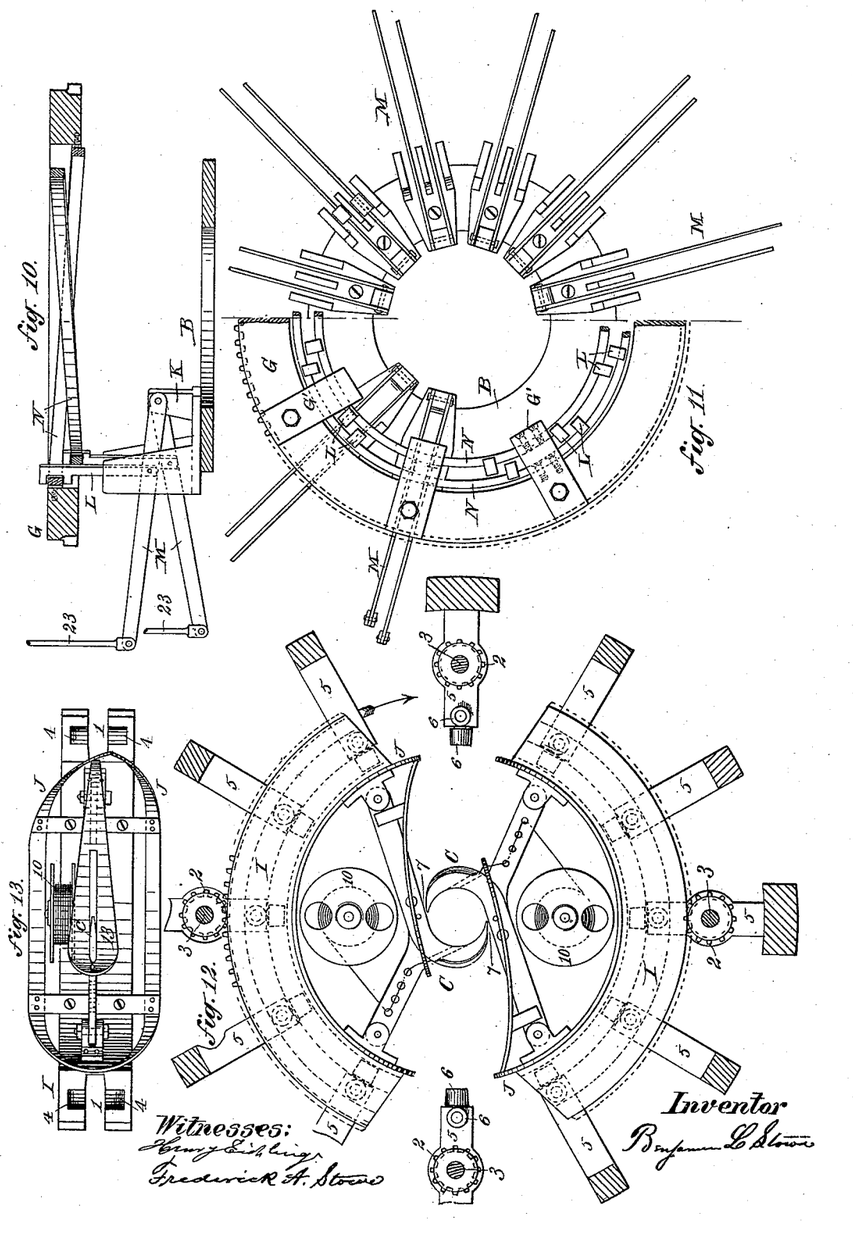
Fig. 10 is a section similar to Fig. 9 of a modified arrangement of the rails and harness-operating rods required for an even number of shuttles.
Fig. 11 is a plan of the arrangement shown in the last figure, with a portion of the rail-carrying ring broken away to disclose more clearly the harness-levers and their supporting-ring and brackets.
Fig. 12 is a section on line $xx$, Fig. 1, all of the working parts of the loom being removed except the two segmental shuttles and the pinions for driving the same.
Fig. 13 is an inside elevation of one of the shuttles.

The machine represented in Fig. 1 is intended for two shuttles, as shown in Fig. 12. Each shuttle in a general way resembles that shown and described in my Letters Patent No. 194,740, comprising a shuttle-body I, a divider or separator 13, a spool 10 for the weft-thread, and a thread-lifter or guard J, (both above and below the shuttle-body I.) All of these parts are substantially the same as the like designated parts in my said Letters Patent last referred to. In lieu, however, of the shuttle-arm 12, (shown in the said patent,) I now make use of the device lettered C, which I term "forming-packer." I have also improved the shuttle supporting and driving mechanisms, and have devised a new and efficient form of weft-tension.

The shuttle-body, as will be seen by reference to Figs. 1 and 13, has a deep longitudinal groove 1 cut in its outer face, dividing that face into two equal portions, both of which are toothed and engage pinions 2 upon each one of the upright driving-shafts 3, by which the shuttle is driven. The groove 1 extends well into the shuttle-body, and from it at a point about midway between the outer and inner faces of the shuttle-body are cut two longitudinal grooves 4 4, one into the upper portion and the other into the lower portion of the shuttle-body. Arms 5 from the frame extend into the groove 1, each arm carrying three anti-friction rolls 6, one to enter the upper groove 4, the other to enter the lower groove 4, and the third to enter the innermost portion of the main groove 1. The office of said rolls is to support and steady the shuttle during its movement, and this they do effectively. The two racks cut in the two portions of the external face of the shuttle-body, and which engage two sets of driving-pinions 2, as shown, afford a better and more durable driving mechanism than that heretofore in use. These pinions are mounted on vertical shafts 3, which at their lower ends are provided with pinions 311, engaging the rotating power-driven lower gear-ring G, more particularly referred to in connection with the harness-operating mechanism.

I pass now to a description of the forming-packer. In the loom described in my said patent, No. 194,740, the weaving is done upon the upper edge or rim of a tube, (lettered D in the specifications of said patent,) and the size of the fabric woven is determined by the size of the said rim. In my present loom I dispense with this rim entirely, making the pillar D stop short of the weaving-point and using it merely as a guideway through which the woven fabric can be led to the take-up drums. This I am enabled to do by reason of the forming-packer C, which is the instrumentality I now make use of both to "beat up" the work and to control entirely the size of the fabric.

Figure 14:
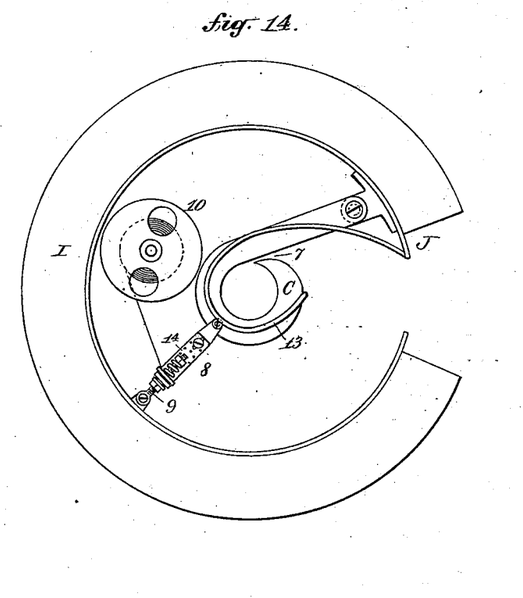
Fig. 14 is a plan of a shuttle such as employed when but one shuttle is used in the loom, showing also an improved weft-tension device.

The forming-packer, which is attached to and carried by the shuttle-body, has a curved or bent inner end, the inner edge of which curved portion constitutes its operating-face. The forming-packers upon their operating-face are preferably made to conform as nearly to a true circle as it is possible to make them, and yet to admit of a sufficient space 7 to allow the warps to pass between the rear of one and the body of the next packer should a plurality of packers be employed, as in Fig. 12, or between its rear end and the point upon its body which said rear end approaches, if but one packer is employed, as in Fig. 14; but in any case, whether the packer or packers at the operating end form a true circle or an oval, the opening 7 should be as narrow as possible without impeding the passage of the warps. The size of the working-face of the packers is proportional to the size or diameter of fabric to be woven in the loom, and I consequently provide interchangeable packers to enable the loom to be used for the production of different sizes or diameters of tubular fabric. The inner end or point of each forming-packer projects through between the branches of the looped or slotted inner end of the appropriate divider or separator 13 in the same manner in which the arm 12 is provided for in my patent, No. 194,740.

The advantages of the improved packer are that it enables me to beat the fabric closer than formerly and to dispense with the excessive amount of tension upon the weft which the older form of packer required.

The shuttle-body, it will be noted, rotates always in one and the same plane, and the forming-packer is fixed to said shuttle-body so as to have rotary movement in one plane only and to occupy throughout its extent the same invariable position with relation to the work. By reason of this construction and arrangement of parts the forming packer or packers, completely encircling, as they do, the fabric, except at the narrow passage or passages 7, serve to determine the size or diameter of the fabric, and, in conjunction with the warp-tension mechanism, to beat up the work. As the weaving progresses the fabric at the weaving-point is pushed downward by the forming packer or packers acting at all times on the circumference of the fabric against the resistance which is constantly offered by the warp-tension mechanism, and in this way a most compact and closely-woven fabric is produced.

Figure 15:
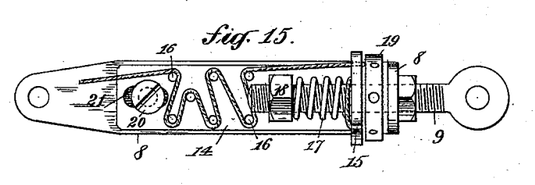
Figure 16:
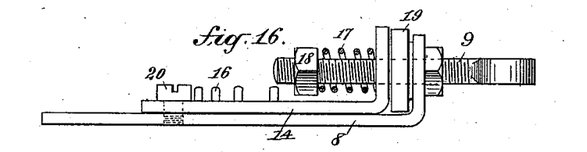
Fig. 16 is a side elevation on enlarged scale, of said weft-tension.
Figure 17:
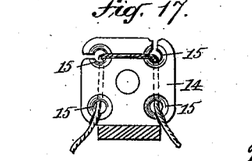
Fig. 17 is a front elevation of the weft-tension plate with its base in section.

The weft-tension shown in Fig. 12 is of the ordinary kind; but the weft-tension which I prefer to employ is illustrated in Figs. 14 to 17, inclusive, the same being an automatic tension intended to maintain a regular and uniform tension upon the weft or filling, notwithstanding any slight irregularities that may occur in the resistance offered by the spool or bobbin 10, on which the weft is wound. The parts of the tension are carried by a bracket 8, the screw-threaded stem 9 of which is secured at its outer end to the shuttle-body. The L-shaped plate 14 is the weft-tension plate, in the vertical portion of which are formed holes 15, (one or more of which are slotted, as seen in Fig. 17,) while the base portion of said plate carries tension-pins 16. The plate 14 is mounted on screw-stem 9 and is acted on by a spring 17, surrounding said stem and confined between the vertical part of the tension-plate and a nut 18 on the inner end of the stem. By this spring the tension-plate is pressed against a disk 19, interposed between it and the outer end of the bracket 8. The disk, which is mounted on the screw-stem 9, should be either threaded itself or backed by a threaded nut, so as to maintain a certain position upon the stem. The tension-plate is guided and limited in its movements by a retaining-screw 20, which passes through a slot 21 in said plate into the base of the bracket beneath. The nut 18 regulates the initial compression of the spiral spring 17, and consequently the weft-tension. Thread from the spool 10 is passed through the holes or slots 15 in plate 14 in such a way as to bring the weft at one or more points between the plate and the disk 19, as indicated in Figs. 15 and 17. It thence passes around as many of the tension-pins 16 as required, and from them through the separator and packer and into the fabric. The action of this automatic weft-tension is as follows: The weft as it passes between the tension-plate and disk is there subjected to a predetermined pressure, due to the stress of the spring 17, and consequently acquires a certain degree of tension from the friction, which tension is increased as it passes around the tension-pins 16. Now, supposing that the tension of the weft is regulated to a certain degree of tightness with the bobbin 10 entirely free to revolve, if for any reason the bobbin should become bound or slightly impeded in its movement the tension manifestly would be increased beyond the limit set, and in such event unless the excessive tension be relieved the weft might break or the fabric might be otherwise injured. This relief is afforded by the arrangement shown in the drawings, because when tension of the weft becomes unduly increased the weft draws inward upon the tension pins and plate against the stress of the spring, slightly compressing the spring and drawing away the plate from the disk far enough to reduce the pressure upon the weft at that point, and thus relieving the excessive weft-tension.

Having described those portions of the machine which have to do with laying and beating up the weft or filling, I now proceed to the mechanisms which operate on and control the warps.

The loom shown in the drawings is provided with two shuttles, as before remarked, and is intended to weave single-ply fabrics, although it is to be understood that any convenient number of shuttles may be employed. If two or any other even number of shuttles be employed, I prefer to use the harness-operating mechanism illustrated in Figs. 1, 10, and 11 of the drawings, while if one shuttle or other odd number of shuttles be used I prefer to use the mechanism illustrated in Figs. 6, 7, 8, and 9. The harness mechanism which extends around upon the outside of the loom I divide preferably into twelve sections or divisions, as indicated in Fig. 3, each section being complete in itself and distinct from all of the others, except so far as concerns the annular harness-operating ways or rails, (attached to the lower revolving gear-ring G,) which are common to all the sections. In each section there are two harnesses H, (one of which is shown in Fig. 20,) each provided with as many eyes 22 as the warps which it is to control. The two harnesses are arranged to slide up and down, one in front of the other, in suitable guideways in the frame of the machine, as seen in Figs. 1 and 3, being so placed that the eyes of the one harness will be opposite the spaces between the eyes of the other, and they are also placed so that when at their mean elevation—that is to say, when the eyes of both are in the same horizontal plane—a warp passing through a harness-eye will extend in a straight line from the "evener," hereinafter described, to the weaving-point, as well as midway of the space between the upper and middle rings B of the frame. The warp-strands in this loom are therefore opened out in both directions from a central plane in forming sheds, and for this reason the warp-guard J of the segmental shuttles is placed alike above and beneath them. The warps are of course threaded alternately through one and the other of the two harnesses, as is required for the proper formation of the sheds. From the lower end of each harness depends a stem 23, which is jointed to the outer end of its appropriate harness-lever M. These harness-levers are radially placed and are pivoted at their inner ends to brackets K, twelve in number, secured to the lowermost ring B of the frame of the machine, and serving to support and guide both the harness-levers and the vertical harness-operating rods L, which at their lower ends are jointed to the harness-levers, and have their upper ends fashioned into heads which engage the revolving harness-operating rails N. Said rails are fast to and move with the lower gear-ring G, which is rotated from a pinion 431 on that one of the driving-shafts 3 which is directly geared with the shaft $H^3$, as indicated in Fig. 2. This gear-ring also engages, as usual, the vertical shafts 3, which drive the segmental shuttle or shuttles.

The arrangement of rails shown in Figs. 1, 10, and 11 is that which I prefer to use with an even number of shuttles. In this arrangement the two rails N are of different diameters, so that one may be contained within the other. They are placed concentrically with respect to each other, but upon changing planes, being, as it were, tilted in opposite directions, so that when one portion of one rail is raised the corresponding portion of the other rail is depressed, this being true of all parts of them except, of course, where their paths cross or intersect one another, (which are the points where the warp-sheds change.) The outer rail is secured directly to the gear-ring G, and the inner rail is secured by its inner face to brackets G' on said gear-ring. In each pair of rods L the head of one grasps or engages the outer rail, and the head of the other grasps or engages the inner rail, as seen plainly in Fig. 1. Thus as the annular gear-ring G revolves, carrying with it the rails N, the harnesses will be moved up and down through the intermediary of the harness-operating rods L and harness-levers M to form the warp sheds.

When it is desired to use an odd number of shuttles, certain modifications in the rails and heads of the rods which engage them require to be made. Such modified arrangement is represented in Figs. 6 to 9, inclusive, the same being designated for a single-shuttle loom.

In lieu of one outside and one inside annular rail, I employ for all portions of the circle, except where the two paths cross one another, three rails outside and three rails inside, and at the crossing-point two outside and two inside rails. The three rails occur where the tracks are level. The rails in each set are placed one above the other, so as to form between them on the level portion of the track two channels. The two channels of the one set are in the same horizontal plane with the corresponding channels of the other set. When there are but two rails, (which is where the tracks incline,) there will be one channel only. Again the two sets of rails are not concentric throughout their entire circumference, but are placed farther apart at that portion where their paths cross and are inclined, as indicated at 24, Figs. 6 and 8.

Figure 9:
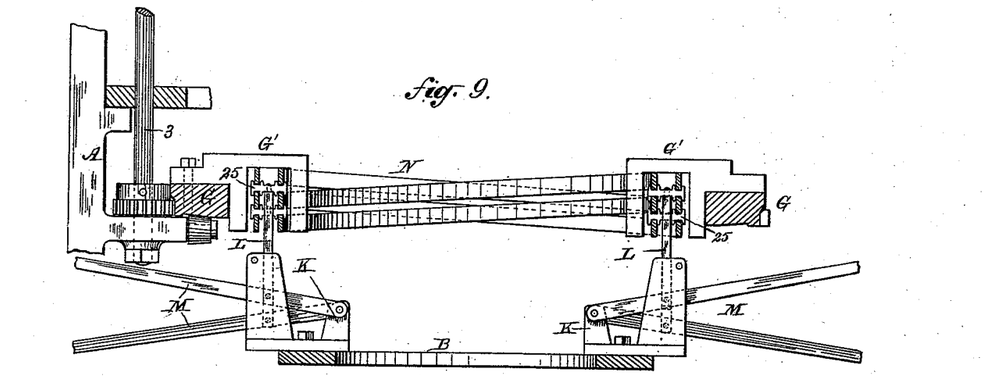
Fig. 9 is a vertical central section of said rails and ring, showing also the harness-levers and their supporting-ring and brackets.

The vertical harness-operating rods L, in lieu of having heads with side lugs to grasp the rails, as in Figs. 10 and 11, have grooved cross-heads 25, which are adapted to enter and run in the two corresponding channels of opposite sets of rails throughout the level portion of said rails, as seen in Fig. 9, the projecting lips which bound the grooves in the cross-heads causing the latter to be retained in said channels, except at the points 26, where the rails are cut away to permit them to be disengaged. These points 26 are where the space between the two sets of rails widens. Of each pair of rods L, when the one is in the upper channel the other is in the lower channel.

Figure 6:
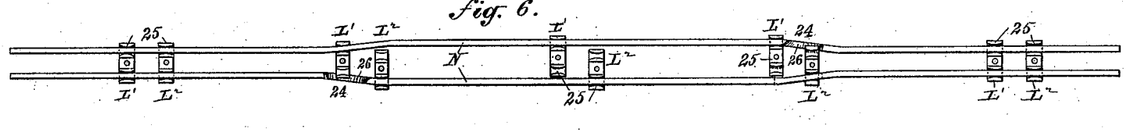
Figure 7:
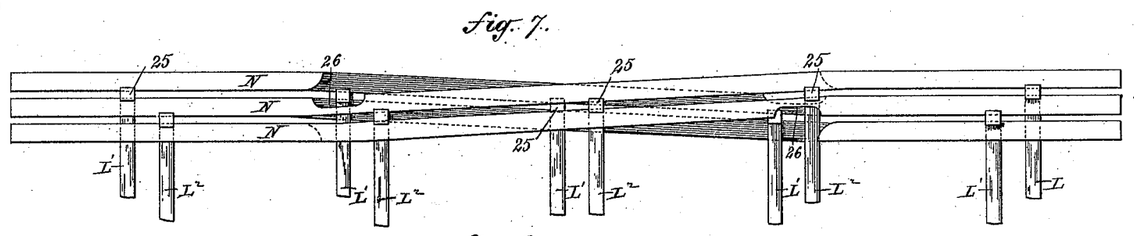
Fig. 7 is a like elevation, of the rails by which the harness-operating rods are moved.
Figure 8:
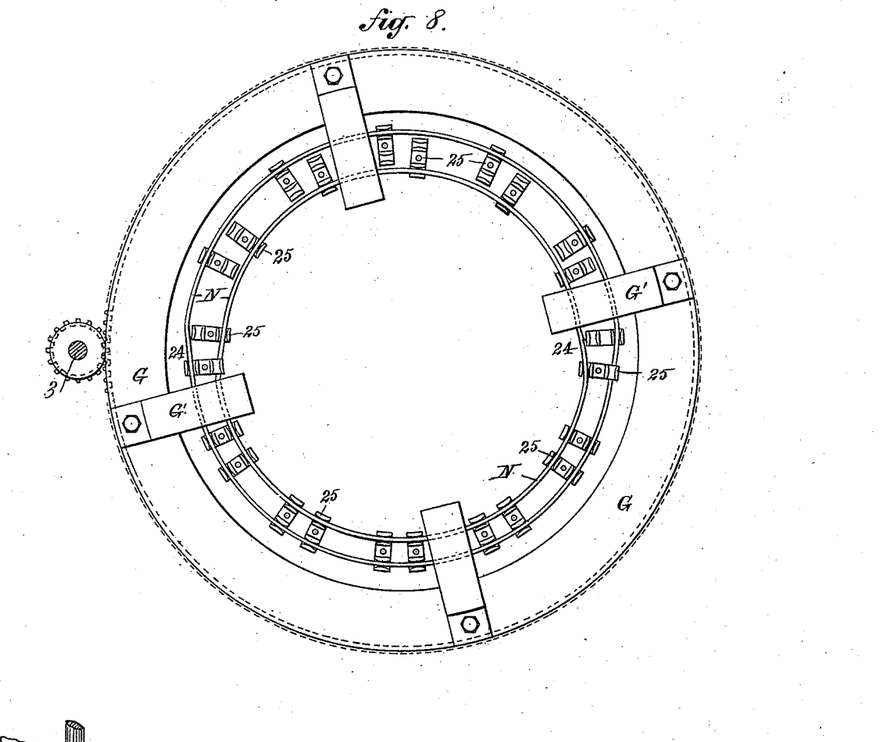
Fig. 8 is a plan of the harness-operating rails and their supporting rotary ring, showing the pinion for driving the same, and showing also the heads of the harness-operating rods.

To explain the method of operation of this, let us follow a pair of harness-operating rods in their course during a revolution of the loom, starting, for example, with the pair of rods on the extreme left of Figs. 6 and 7 and lettered L' L². Following the two rods in these figures from left to right, they are shown in five different positions. Taking L', in its first position it is in the upper channel with its cross-head engaged by both sets of rails. Following it along to its second position, it has reached the inclines, and here we find that by reason of the ending of the upper rail of the inside set and the recess 26 in the upper edge of the middle rail the cross-head of L' is engaged upon one side only—that is to say, in the upper channel of the outside set of rails, which channel has, as seen in Fig. 7, a downward incline. It is in order that the downward passage of the cross-head of L' may not be obstructed that the distance between the two sets of rails is here increased. During its downward passage, as shown in its third and fourth positions, the cross-head of L' is held in the outside channel only, and remains so until the bottom of the incline is reached. Here, however, the two sets of rails again approach each other, and here also, just in advance of the point where the bottom rail of the inside set begins, is a notch or recess 26 in the under edge of the middle rail (or what is about to become the middle rail) of the inside set. Thus as the cross-head of L' advances it is permitted to again enter the appropriate channel of the inside set and to be again engaged by both sets of rails, as indicated in the fifth position of L'; but it will be noted that while L' started from the upper channel it is now in the lower channel. Following the other one L² of the pair, it will be found that in a similar way, starting from the lower channel, it finally reaches the upper channel.

Having described the warp-shed-forming mechanism, I now proceed to a description of the manner of holding the warp-bobbins and of conducting the warps from said bobbins to the weaving-point, referring for this purpose more particularly to Figs. 1, 2, 21, and 22.

Creels or warp-racks (usually one rack for each section of the loom) are arranged upon the floor beneath the one occupied by the loom, as seen at F, Fig. 2, in such manner that while the loom is running any spool can be removed without disturbing any other warp-thread than the one upon the bobbin or spool removed, and also in such manner that warp can be cut and spliced or rejoined without notice to the loom-operator above, thus providing a constant supply of warps for the loom without requiring it to be stopped. The warps run from the spools up through a series of holes or eyes 27 in the top of the rack F, and thence through a tube 28 in the floor above. Usually all the warps from one rack run through one tube. After passing through this tube the warps are separated again and are run each through a separate hole or eye in one or more bars 29, from which they lead up to and over an evener-roll E, there being one evener-roll for each section of the loom, as indicated in Fig. 3. In this figure I have deemed it necessary to show but one of the evener-rolls as grooved; but in practice each roll has annular grooves, as shown in the one roll referred to, one groove for each warp-strand. The effect of this arrangement is to cause all of the warp-strands of the evener-roll to enter the loom at uniform speed. Between the evener and the harnesses is an automatic warp-tension, Figs. 1, 2, 3, 21, and 22, consisting of two annular concentric rods $p$, supported by the brackets which uphold the eveners. These rods are placed in about the same horizontal plane and are connected by a series of cross-pins $o$, the whole forming a ladder-like structure having an edgewise curve.

Tension upon a warp is obtained as follows, referring particularly to Figs. 21 and 22: The warp passes from the evener over the outermost rod $p$, down between the two rods $p$ upon the left-hand side of one of the pins $o$, then back and around the outer rod to the left of the part of the warp already laid thereon, and then down between the two rods again, but this time upon the right-hand side of the pin $o$. The warp is then passed through the eye of a tension-weight $s$, is next brought up, still upon the right-hand side of the pin $o$, and is passed over the inner rod $p$ to the harness. The operation of this tension is as follows: The warp, from the manner in which it passes around the outer rod $p$ and upon opposite sides of the pin $o$, is caused to grip itself. This grip prohibits free motion of the warp around the rod $p$ whenever the loop of warp that passes through the eye of the tension-weight is drawn a little below the level of the pins $o$, but is freed so as to permit the warp to render easily around the rod whenever the eye is drawn up to the level of the pins. The tension-weight exerts equal tension at all times upon that part of the warp extending from it into the loom, whether the weight be raised or lowered. When the loom is in operation, this weight is constantly rising and falling as the shuttle is passing through the shed, but if there be sufficient length to the loop of warp engaged by the eye of the weight so that the eye will not rise up to the level of the pins $o$ no additional warp will be drawn from rack F up through the floor, even though the warp should be left entirely loose at that point, as it usually is while a bobbin is being renewed. In concluding my description of this portion of the loom mechanism I remark that a pipe $t$, Fig. 2, running from about the level of the top of the loom down to the floor upon which the spool-racks F are stationed, affords a means of communication between the loom-operator and the bobbin-changers.

I next proceed to describe my improved take-up mechanism and parts connected therewith.

The two take-up drums $b\,c$ in their arrangement and mode of operation, as well as in the means by which they are driven, do not differ from what is shown and described with reference to the like drums in Letters Patent No. 161,272, of March 23, 1875. The woven fabric passes from the pillar D down under the first drum $b$, thence up between it and the second drum $c$, thence over the last-named drum, and then down under both drums, passing thence to a take-up reel, which will be presently described. What I have added to the take-up drums is a roller $d$, geared to and driven by the drum $c$, whose office it is to press the woven fabric between itself and drum $c$, being for this purpose mounted on the shorter end of an angle-lever $e$, pivoted at $e'$ in the base which supports the take-up drums, and having its longer end formed as a treadle $e^2$. The object of this pressure is to assist the drums in drawing the fabric away from the loom to press the fabric flat, and particularly to hold the fabric when it is released from the tension of the take-up reel.

Figure 4:
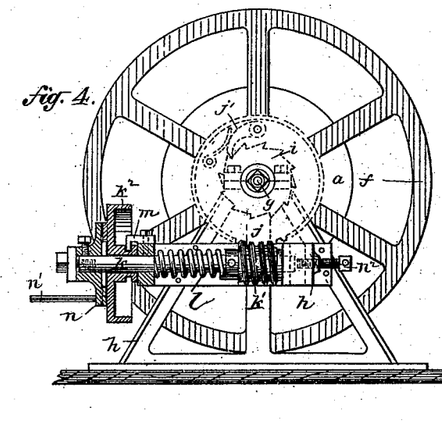
Figure 5:
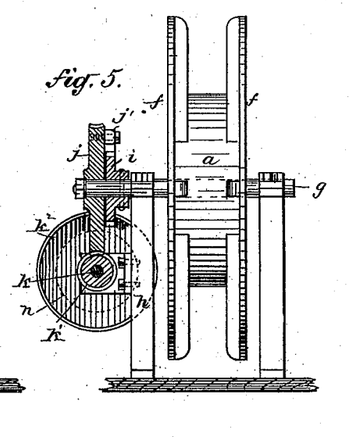
Fig. 5 is a rear elevation, of the take-up reel and its appliances, a small portion of the mechanism in each figure being shown in section.

The take-up reel (shown in Figs. 3, 4, and 5) consists of a winding-drum $a$, provided with sides $f$ to retain the woven fabric in place, said drum being carried by a shaft $g$, having bearings in a frame $h$. Fast to the shaft is a ratchet-wheel $i$, and loose upon it is a worm-wheel $j$, provided with a spring-pressed pawl $j'$ to engage the ratchet. Supported in suitable bearings on the same side of frame $h$ with worm-wheel $j$ is a horizontal shaft $k$, placed below and at right angles with the axis of the reel. Said shaft $k$ is longitudinally movable in its bearings, and has fast to it a worm $k'$, which engages worm-wheel $j$. Between the worm $k'$ and the bearing for the opposite end of the shaft $k$ is confined a spiral spring $l$, which encircles the shaft. The shaft at the end opposite that on which the worm is placed extends through and beyond its bearing, and has loosely mounted on this end a driving-pulley $k^2$, to which motion is communicated from some suitable source of power. The pulley is kept from sliding with the shaft by a detaining-arm $m$, which enters an annular groove in its hub, Fig. 4. On the end of the shaft beyond the pulley is fixed a disk $n$, and both the pulley and the disk are provided on their interior opposite faces with "striking-pieces," forming in effect the two parts of a clutch normally held together by the spring $l$ and compelling the shaft to revolve with the pulley. The operation of this take-up reel is as follows, assuming that the fabric has been led to it from the take-up drums and that the pulley $k^2$ is in movement and driving the reel: So long as the fabric is free to be drawn out from the loom the reel will continue to revolve and to take up the fabric; but so soon as the tension or resistance of the fabric is sufficient to overcome the stress of the spring $l$ then continued revolution of the worm will have the effect of forcing it and its shaft to move endwise in a direction to separate the two parts $k^2\,n$ of the clutch. As soon as this separation takes place the pulley revolves without the shaft, and this condition will continue until the tension of the fabric is reduced sufficiently to permit the spring by its reaction to again throw the disk $n$ into engagement with the pulley, at which time the winding up of the fabric will be resumed. When it is desired to remove the fabric from the wheel, the disk $n$ is disengaged from the pulley by means of a hand-screw $n^2$, which screws through the frame $h$ against the worm end of shaft $k$. The shaft by means of a handle $n'$, with which disk $n$ is provided, is rotated in a reverse direction until the tension on the fabric is sufficiently relieved to permit the pawl $j$ to be disengaged from the ratchet-wheel $i$. The reel is thus freed from the restraint of the worm-wheel $j$, and the fabric can be unwound from it with facility. By means of this reel a tension can be maintained on the fabric at all times, except when it is desired to remove the fabric, and at the same time the fabric can be reeled up at whatever speed it may ordinarily be delivered from the drums. Fastened to the shaft of one of the take-up drums—the drum $c$ in this instance—is a measuring device, by means of which required lengths of fabric may be indicated. The device is shown in Figs. 1 and 3. It consists of a screw-threaded stem 30, which projects from and on the prolongation of the shaft or drum $c$, and revolves with the same and carries two set-nuts 31 32 and a threaded disk 33. From the disk projects a crank-handle 34, which passes freely through a hole in the lower end of a vertical rod 35, Figs. 1 and 3, which rod rests by its weight on the handle and is supported in or by suitable guides which will permit it to rise and fall. The rod may run to the top of the loom, so as to be within sight of the loom-operator; or, if preferred, it may be arranged in other ways to afford an indication at the proper time.

The measuring device operates as follows: Suppose, for instance, that a piece of fabric is required to be a certain length, say fifty feet. The number of revolutions of the take-up drum necessary to draw away fifty feet should be computed. The threaded disk 33 is then run out by hand until it rests against the outer set-nut 31, and the inner set-nut 32 is adjusted to a distance therefrom equal to the number of turns of thread which must be traversed by the disk while the drum is making the required number of revolutions. When the drum $c$ starts, the screw-stem 30 will revolve with it; but the weight of the vertical rod 35 on the handle 34 will keep the handle down, and will consequently keep the disk from revolving until the disk by this means has been advanced upon the screw far enough to meet the inner set-nut. When this takes place, the travel of the disk is arrested. It must therefore rotate with the screw, and in so doing it by its handle 34 lifts the vertical rod 35, thus indicating that the desired length of fabric has been produced.

It remains for me only to describe the means which I employ when it is desired to weave the fabric about a rubber tube for hose or other purposes. This will be understood by reference to Figs. 18 and 19.

Figures 18, 19:
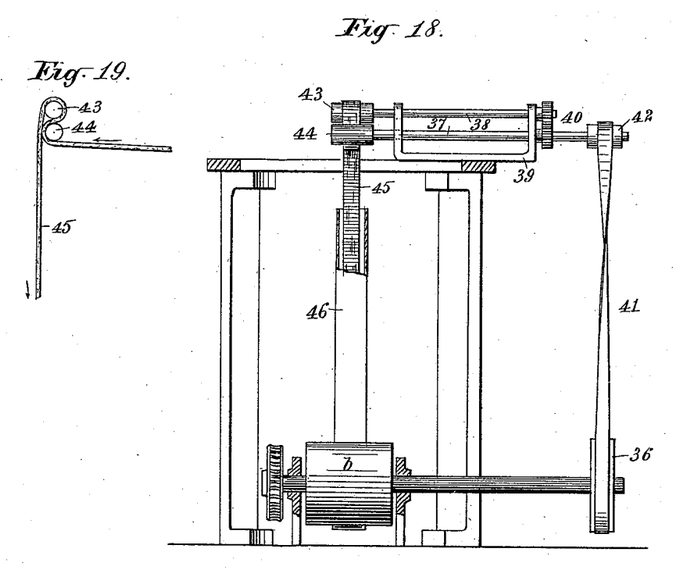
Fig. 18 is a front elevation of mechanism for controlling the tension of a rubber tube about which it may be desired to weave the fabric.
Fig. 19 is a side elevation of the tension-rolls, showing in what manner the rubber tube is passed between them.

Only the skeleton loom-frame is represented in Fig. 18, together with one of the take-up drums, in this instance drum $b$. The shaft of this drum is lengthened out at one end and a pulley 36 is placed upon it. Two shafts 37 38, supported by a casting 39, attached to the top of the loom-frame, are placed parallel with the lower shaft. They are geared together at 40, so as to revolve in opposite directions, and they are driven by a belt 41, which extends from the lower pulley 36 to a pulley 42 on one of the upper shafts. The inner ends of the two shafts 37 38 extend over or nearly over the center of the loom, and on them are fixed rollers or pulleys 43 44. The rubber tube 45, taken from the reel from which it is supplied, is passed around and between these rollers or pulleys, as indicated in Fig. 19, and it passes from them vertically down through the loom, where, at the weaving-point, it meets and is surrounded by the woven fabric. (Indicated at 46 in Fig. 18.) Thence the two pass down together to the take-up drums. It is preferable that the rubber tube shall be slightly shorter than is the fabric while in the loom, in order that the tube may be covered while under some tension. To this end the revolutions of the rollers or pulleys 43 44 are so adjusted with reference to those of the take-up drums that their surface speed is slightly less than that of the drum, the consequence being that the tube is stretched as it enters the loom.

Having described my improvements in circular looms and the best way now known to me of carrying the same into effect, I state in conclusion that I do not restrict myself to the details herein shown and described, because these may be varied considerably without departure from the invention; but

What I claim herein as new and of my own invention is—

1. The combination, with the warp-delivering and tension mechanism and shed-forming mechanism, of one or more rotary segmental shuttles provided with weft controlling and delivering devices and with forming-packers fixed to the shuttle-bodies, so as to be capable of rotary movement only, constructed to entirely encircle the fabric at the weaving-point, except at the warp passage or passages 7, and arranged and operating both to determine the size or diameter of the fabric and to beat up the work, and means for operating the shuttles, as and for the purposes hereinbefore set forth.

2. The combination, with the warp-delivering and tension mechanism and shed-forming mechanism and mechanism for taking up or drawing away the fabric as it is woven, of one or more rotary segmental shuttles provided with weft controlling and delivering devices and with forming-packers fixed to the shuttle-bodies, so as to be capable of rotary movement only, constructed to entirely encircle the fabric at the weaving-point, except at the warp passage or passages 7, and arranged and operating both to determine the size or diameter of the fabric and to beat up the work, and means for operating said shuttles, as and for the purposes hereinbefore set forth 3. The segmental shuttle-body and means for rotating the same in one plane only, in combination with the separator 13 and the forming-packer C, fixed immovably to said shuttle-body, as and for the purposes hereinbefore set forth.

4. One or more rotating segmental shuttles provided with weft controlling and delivering devices and with forming-packers fixed to the shuttle-bodies, so as to be capable of rotary movement only, constructed to entirely encircle the fabric, except at the warp passage or passages 7, and arranged and operating both to determine the size of the fabric and to beat up the work, and mechanism for operating said shuttles, in combination with warp delivering and tension mechanism, vertically-moving warp-shed harnesses encircling the loom-frame and arranged in sections consisting each of a pair of harnesses, and mechanism arranged and operating to reciprocate each pair alternately in opposite directions at the proper times to form the warp-shed, substantially as and for the purposes hereinbefore set forth.

5. The segmental shuttle-body provided with the grooves 1 and 4 4, in combination with the supporting or guiding arms 5, provided with anti-friction rolls to enter said grooves, substantially as and for the purposes hereinbefore set forth.

6. The segmental shuttle-body provided with grooves 1 and 4 4 and with racks or gear-teeth on the two portions of its external face above and below said groove 1, in combination with the supporting-arms 5, provided with anti-friction rolls to enter said grooves, and the driving-shafts provided each with a pair of pinions 2 to engage said racks, as and for the purposes hereinbefore set forth.

7. The combination, with the shuttle-body, of the tension-disk carried by said shuttle-body, the sliding tension-plate bodily movable to and from said disk and provided with openings through which the weft is threaded, means for supporting and guiding said plate, and a spring whereby the plate is pressed toward or against the disk, substantially as and for the purposes hereinbefore set forth.

8. The combination, with the shuttle-body, of the tension-disk carried thereby, the tension-plate movable to and from said disk and provided with openings through which the weft is threaded, means for supporting and guiding said plate, a spring whereby the plate is pressed toward or against the disk, and tension-pins connected to and moving with the tension-plate, substantially as and for the purposes hereinbefore set forth.

9. The rotating gear-ring and the inner and outer annular harness-operating rails attached to and moving with the same and placed so that they shall be in different planes, except where their paths cross, as described, in combination with harness-operating rods provided with heads to engage said rails, substantially as and for the purposes hereinbefore set forth.

10. The combination of the warp-harnesses, the harness-levers, the rotary gear-ring provided with inner and outer annular harness-operating rails N, and the harness-operating rods L, engaging said rails and connected to the harness-levers, the combination being and acting substantially as hereinbefore set forth.

11. The herein-described warp-tension, consisting of the rods $p$ $p$, cross-pins $o$, and weights $s$, under the arrangement and for operation substantially as hereinbefore set forth.

12. The warp delivering and operating mechanism encircling the loom and divided into sections, consisting each of an evener-roll, an individual warp-tension, a pair of harnesses, harness-levers, and harness-operating rods, in combination with the rotating gear-ring provided with inner and outer harness-operating rails common to all the sections, substantially as and for the purposes hereinbefore set forth.

13. The combination of the take-up reel, the ratchet-wheel $i$, fast upon the axle of the wheel, the worm-wheel $j$, loose upon said axle and provided with a pawl to engage the ratchet-wheel, the worm $k'$, the longitudinally-movable worm-shaft $k$, the driving-pulley $k^2$, loose on said shaft, the disk $n$, and the spring $l$, these parts being constructed and arranged for joint operation as hereinbefore set forth.

14. The measuring device comprising the screw-threaded revolving stem 30, the set-nuts 31 32, the threaded disk 33, provided with crank-handle 34, and the rod 35, engaged by said handle and operated thereby at the time and in the manner substantially as hereinbefore set forth.

15. In combination with the weaving mechanism and the take-up drums, the power-driven rubber-tube delivery-rolls 43 44, arranged over or nearly over the center of the loom above the weaving-point, under the arrangement and for operation substantially as hereinbefore set forth.

In testimony whereof I have hereunto set my hand this 12th day of November, A. D. 1887.

BENJAMIN L. STOWE.

Witnesses:
HELEN J. STOWE,
F. A. STOWE.